March 2, 1965     J. C. DRESCHER     3,171,403
SOLAR HEATING SYSTEMS
Filed May 17, 1962                                                      5 Sheets-Sheet 1
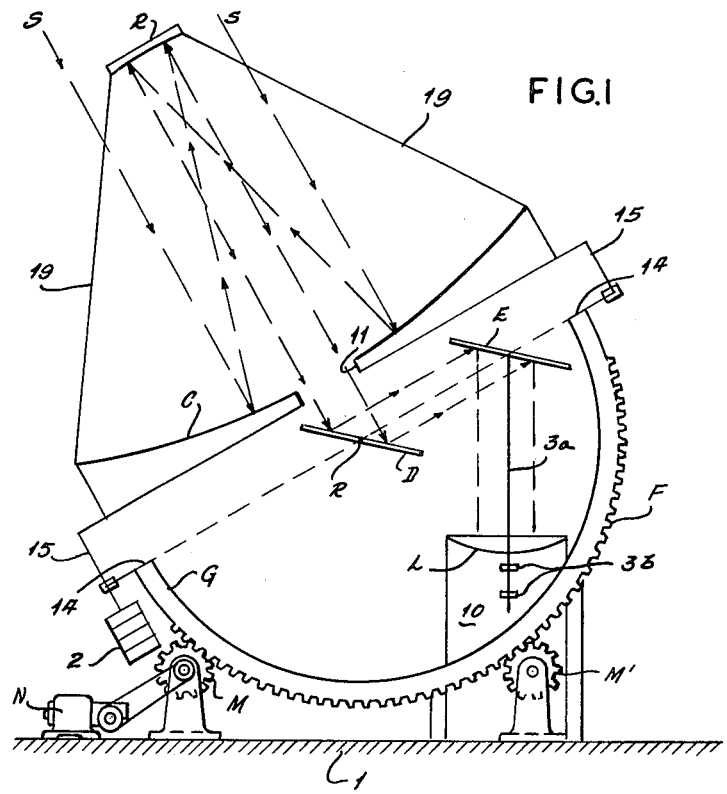
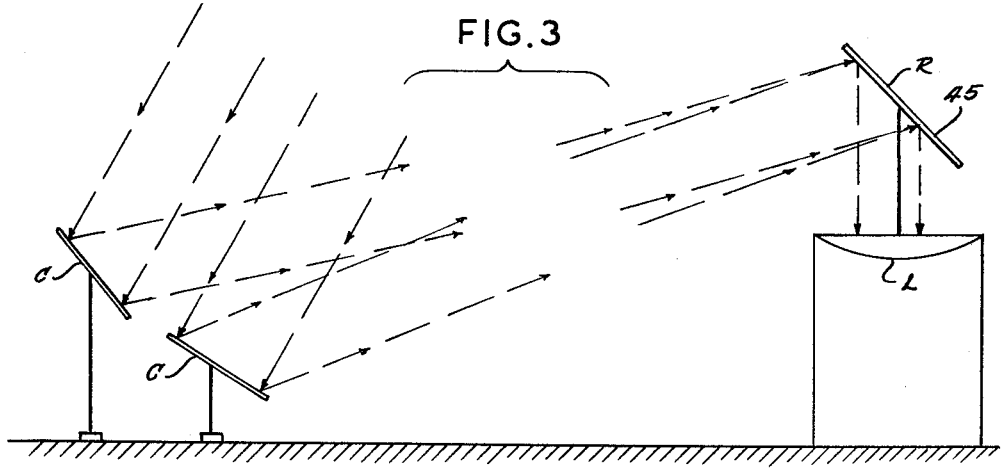
INVENTOR:
JOHN C. DRESCHER
BY
*Sutherland, Poleter & Taylor*
ATTORNEYS.

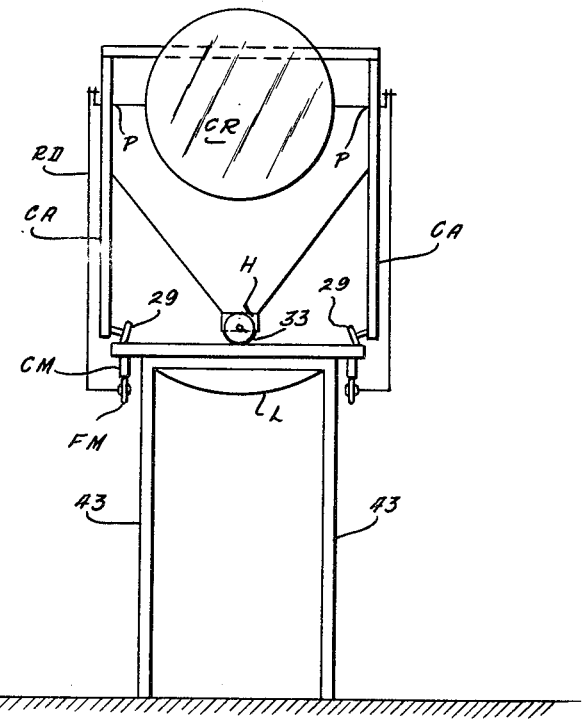
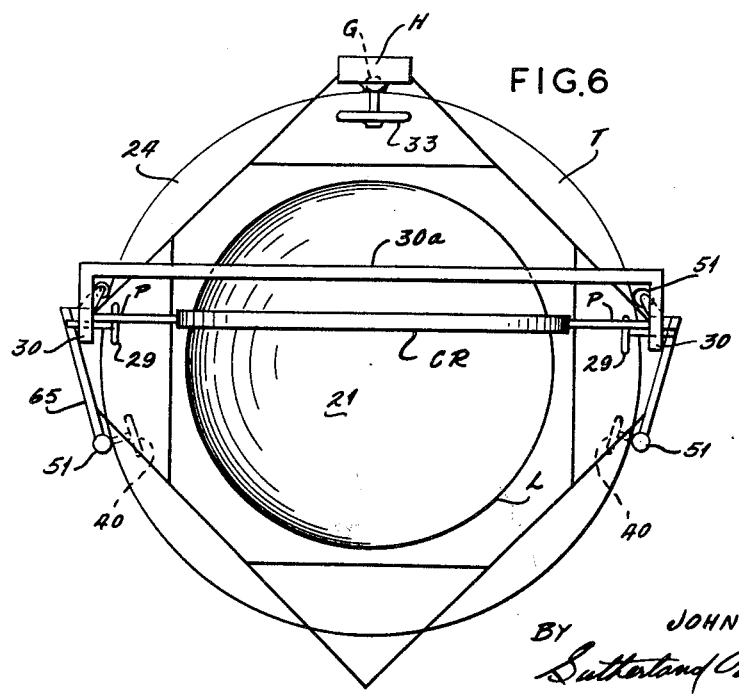

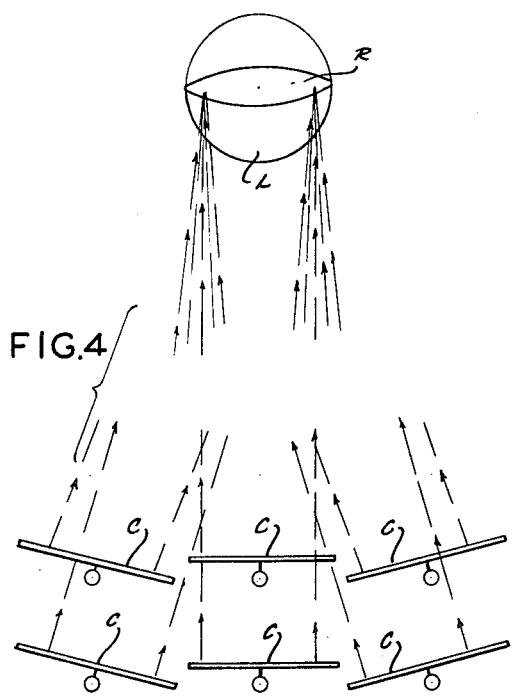
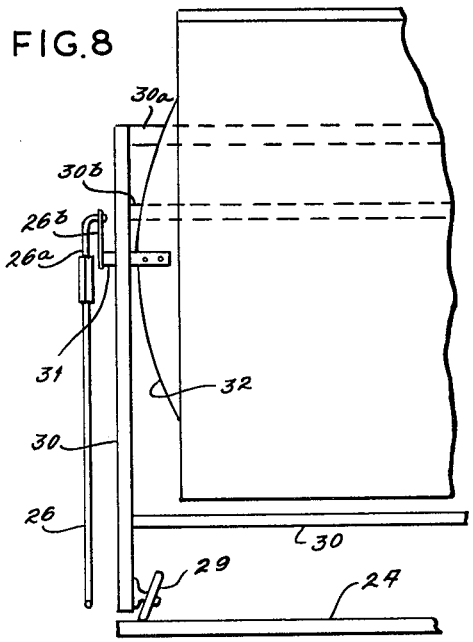
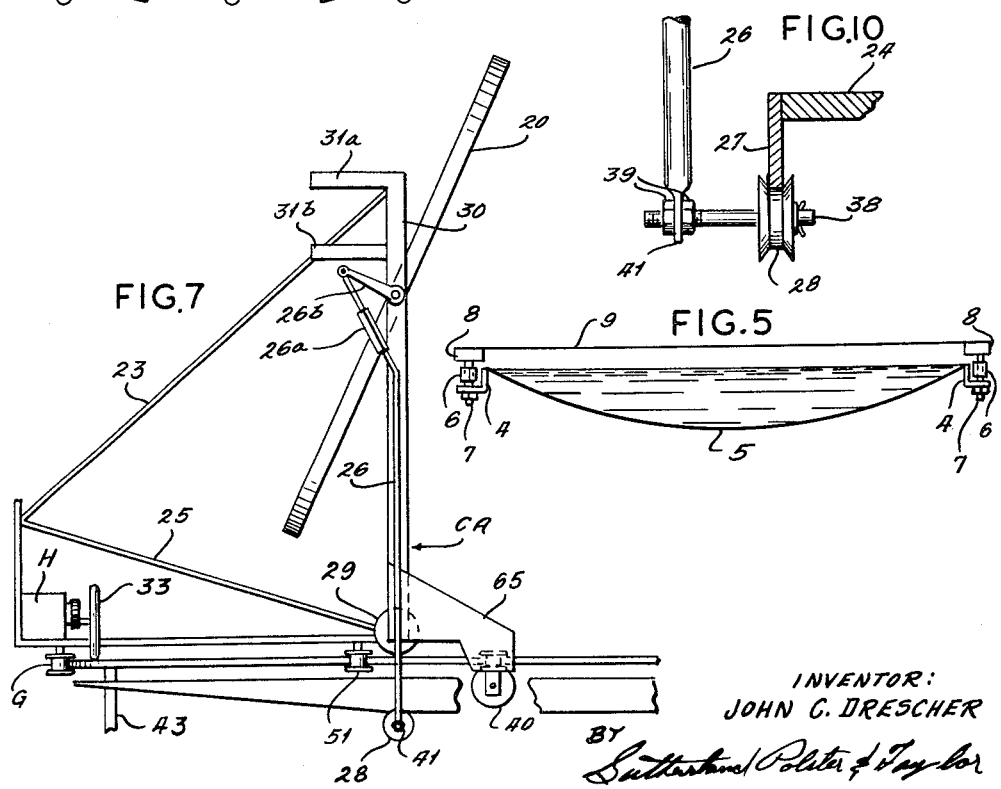

March 2, 1965     J. C. DRESCHER     3,171,403
SOLAR HEATING SYSTEMS
Filed May 17, 1962     5 Sheets-Sheet 4
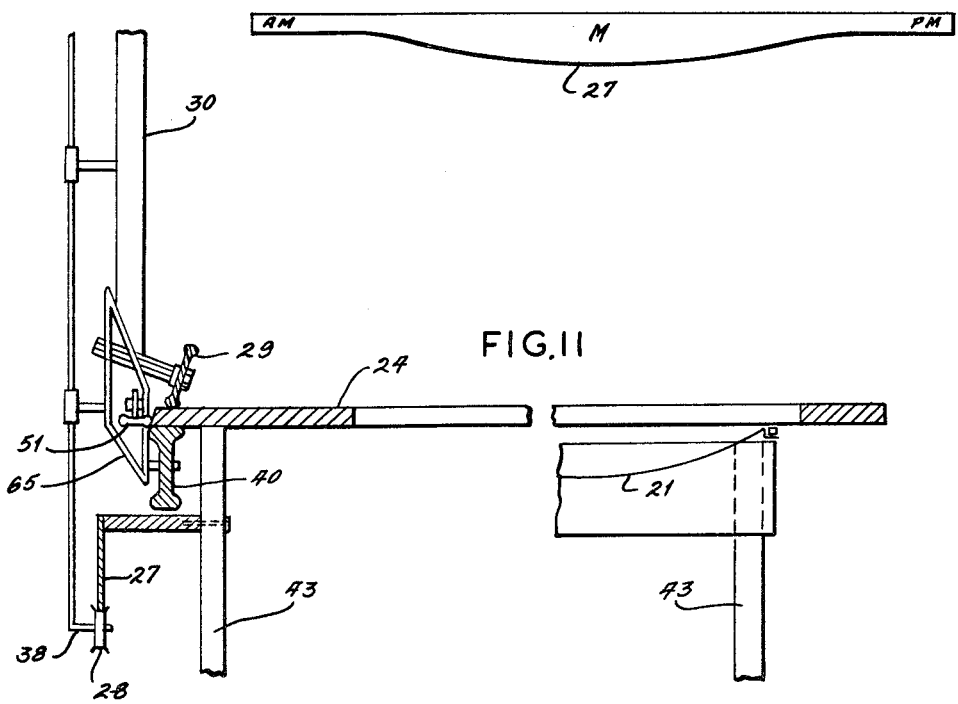
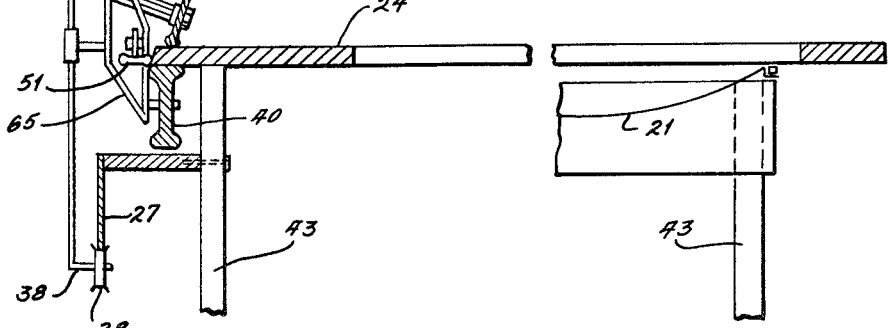
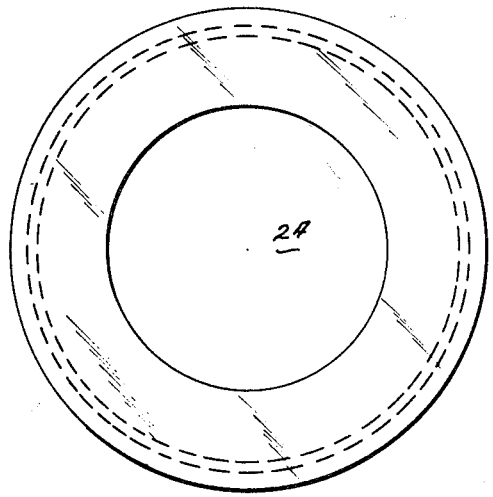
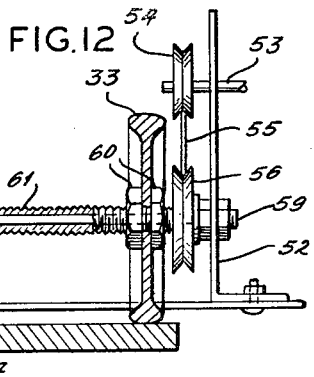
INVENTOR:
JOHN C. DRESCHER
BY Sutherland, Poletar & Taylor
ATTORNEYS.

March 2, 1965 J. C. DRESCHER 3,171,403
SOLAR HEATING SYSTEMS
Filed May 17, 1962 5 Sheets-Sheet 5
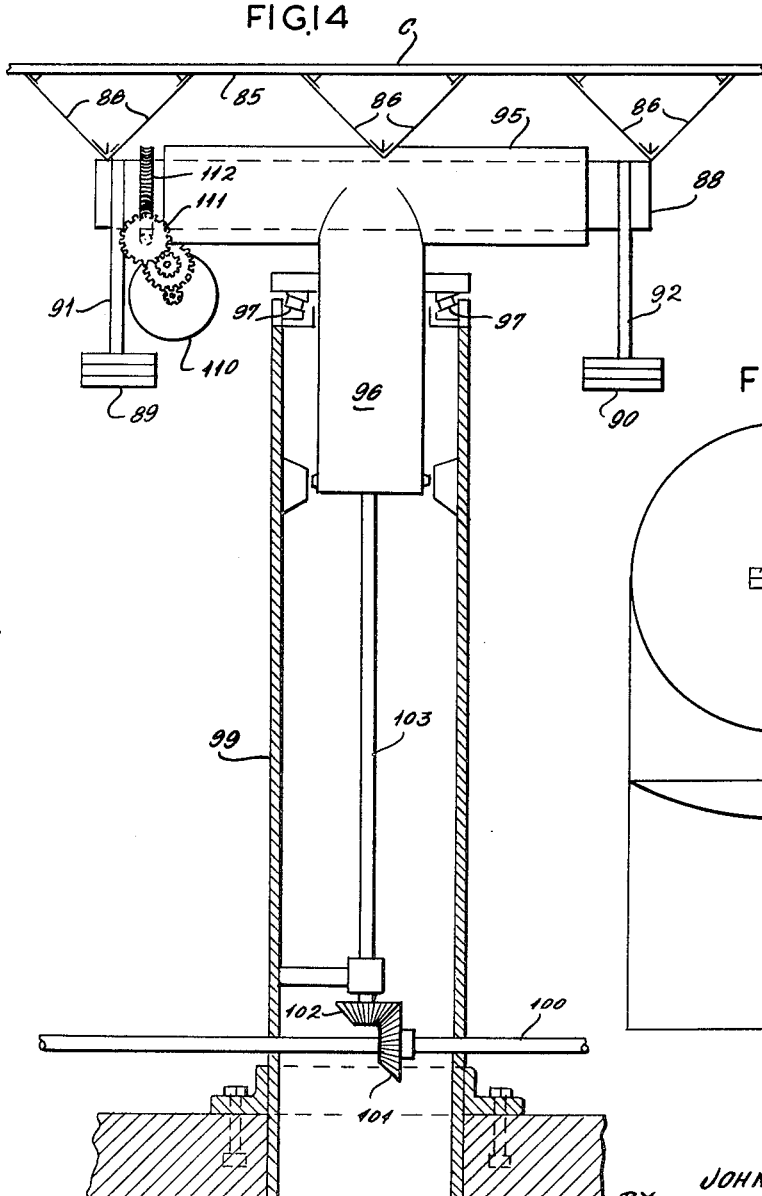
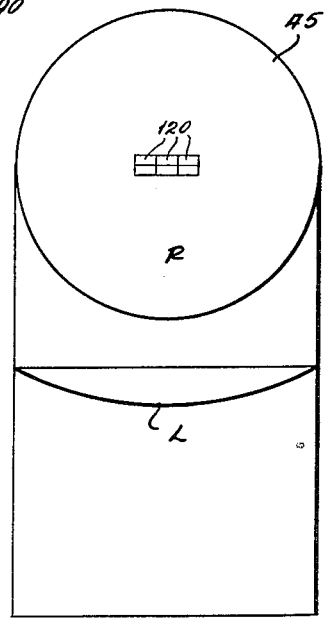
INVENTOR:
JOHN C. DRESCHER
BY Sutherland Poster & Taylor
ATTORNEYS United States Patent Office 3,171,403
Patented Mar. 2, 1965

3,171,403
SOLAR HEATING SYSTEMS
John C. Drescher, 2623 N. 81st Way, Scottsdale, Ariz.
Filed May 17, 1962, Ser. No. 195,510
15 Claims. (Cl. 126—270)

This invention relates to solar heating systems, and more particularly to a novel arrangement of optical parts and operating mechanisms for collecting, receiving, and focusing rays of light from a diffused source, such as the sun, into a localized zone of very high temperatures, which zone is so arranged as to constitute a convenient source for performing useful functions in the art of metallurgy, in the art of distillation recovery processes and in the power recovery art. This application is a continuation-in-part of my prior application, Serial No. 9,904, filed February 19, 1960, for "Solar Heating Systems," now abandoned.

According to this invention, the solar heating system provides for collection of the dispersed rays from a source of solar heat (the sun). For this purpose, the system includes a plurality of dispersed, collector means with dirigible mountings which follow the sun at all altitude and azimuth angles. Preferably these dirigible mountings are powered by timed means so that the mentioned function is automatic, but the system does not necessitate a mechanism of the complexity used in telescopes for this purpose, because such accuracy is not necessary where, as here, the collectors are preferably plain mirrors as now contemplated. From the collectors, the rays may be transmitted to a receiver means which may also be a plain mirror or mirrors, and then directed to a lens for focusing. In order to avoid expensive equipment, the lens contemplated is formed in part by the action of gravitational pull on a pool of fluid, and in part by a transparent flexible membrane support which is somewhat elastic, and which, when subject to the weight of the fluid, will form a curved surface of more than one radius from more than one center. Of course, the unsupported fluid surface will be planar, thereby forming a lens which will be generally planar convex, and which will focus the rays directed at its upper surface, at a series of points within a very small zone. This is a very useful effect for the system, because, as a consequence, the heat is not concentrated at a single spot, but is extenuated forming a heating zone. For example, a heat exchanger can be applied, which has a tube concentric with the series of points in the heating zone and a small quartz window closing its upper end providing for the admission of the heat rays. Water may be then circulated through this tube to absorb the heat along the heating path formed along the inside of the tube at the focusing points. On the other hand, a quartz rod concentric with the zone of focusing points would be heated throughout the zone and along its length or its depth. The removal of the heat from the quartz rod outer surface then becomes practical, because the area of heating is thus infinitely greater than would occur at a single focal point.

It is contemplated that this system may have collector and receiver means, which are separate or combined without sacrificing any of the advantages of the invention.

It is an object of this invention to provide for each of the above advantages and features of a solar heating system as herein described.

It is also an object of the present invention to dispose a system wherein the parts are relatively inexpensive, but effective in their operation and result.

It is also an object of the invention to provide an optical system within a solar heating system, in which objects may be readily and conveniently supported at the focused point of the lens by heat resisting receptacles or devices, so that the object to be heated will remain at the focal point even though it changes in its condition, such as might happen in experiments conducted in metallurgy wherein the specimen changes its form, or in vaporization where a similar transformation occurs.

The following is a description in such full, clear, concise and exact terms as to enable any person skilled in the art to make and to use this invention. Further objects and advantages of the invention will appear from the following detailed description taken in conjunction with the accompanying drawings in which:

FIG. 1 is a side elevational view schematically illustrating one form of apparatus constructed in accordance with this invention;

FIG. 2 is a side elevational view schematically illustrating a second form of apparatus constructed in accordance with this invention;

FIG. 3 is a side elevational view schematically illustrating a third form of apparatus constructed in accordance with this invention;

FIG. 4 is a top plan view of the apparatus in FIG. 3 also shown schematically;

FIG. 5 is a side elevational view schematically illustrating the construction of a lens used in each of the forms of apparatus;

FIG. 6 is a top plan view schematically illustrating the form of apparatus shown in FIG. 2;

FIG. 7 is a fragmentary view in side elevation of one of the mirrors and its support for the apparatus shown in FIG. 6;

FIG. 8 is a fragmentary front elevational view of the mirror and support shown in FIG. 7;

FIG. 9 is a schematic illustration in side elevation of a circular cam which is mounted on the bottom of the table in FIG. 7;

FIG. 10 is a fragmentary view schematically illustrating the cam and cam follower for tilting the mirror, or mirrors, about a horizontal axis so as to adjust the vertical angle of the mirror, or mirrors, to follow the change in altitude of the sun as the carriage moves;

FIG. 11 is a front elevation schematically illustrating the carriage mounting on the table in the apparatus shown in FIG. 7;

FIG. 12 is a front elevation schematically illustrating a mechanism for driving a carriage around the table so as to vary the rate of azimuth change to correspond with that of the sun at various seasons of the year;

FIG. 13 is a top plan view of the table top used in the apparatus illustrated in FIG. 7 in which the dotted lines indicate the variation paths of travel in drive wheel engagement with the table to obtain different rates in travel of the carriages around the table;

FIG. 14 is a schematic illustration of the manner of mounting one of a plurality of collectors in the form of apparatus illustrated in FIG. 3;

FIG. 15 is a side elevation of the device shown in FIG. 3 schematically illustrating the control for directing one of a plurality of collector mirrors in the form of an apparatus as shown in FIGS. 3 and 14; and FIG. 16 is a schematic illustration of one of the control means which is mounted in the middle of the mirror receiver in FIGS. 3 and 15 for individually orienting one of the mirror collectors.

In the following detailed description, like reference characters will be used to indicate like parts in each of the embodiments illustrated in the drawings.

FIG. 1 represents an optical device constructed in accordance with the principles of this invention. As illustrated therein, the rays of the sun S are collected by a plurality of mirrors on the concave surface of the collector C. Above the collector C is a concave receiver, indicated as R. This receiver is adjustably supported with respect to the collector C by the struts 19. On the receiver R is a concave surface carrying mirrors which reflect the rays S through the aperture 11 in the center of the collector C. The curvature and spacing between collector C and receiver R is such that the rays of light leaving the receiver R follow parallel paths directed through the aperture 11 in the collector C to the surface of inclined mirror D, which in turn is inclined at an angle of 45° and mounted concentric with an axis through the bearings 14—14 about which the collector C and receiver R are tiltable as a unit. From the mirror D, the rays of reflected sun light are directed to a mirror E and thence to a lens L which will focus the rays in a manner hereinafter described, so as to provide a source of intense heat, which may be utilized for any purpose desired.

In order that the collector C shall follow the orbit of the sun, the collector C is mounted for change in angular position about axes at right angles. This manner of mounting permits the mechanism to adjust the position of the collector C so that a central axis thereof through the center of curvature of the concave mirror surface can be adjusted to point directly at the source of radiant heat which in this case is the sun. The mechanism, schematically illustrated here, is mounted on a base 1 which in turn pivotally supports a frame G having one or more spaced arcuate shaped frame members. These spaced frame members G may have aligned bearings which support the frames for rotation about the point R coincidental with the axis through the bearings 14—14. It is here shown supported upon pairs of gears M and M'. These pairs of gears may be suitably supported on shafts in bearings within standards projecting upwardly from the base 1. Gears M in turn mesh with arcuate gears F on the periphery of the arcuate frames G. The gears M in turn are driven by a motor and speed reducer N. The motor and speed reducer N are preferably reversible so that the frames G can be rocked about the center R in either direction. The motor N may be any step-by-step operating motor, which will vary the angle of the frame G about the center R which in turn will vary the angle of collector C according to the change in altitude of the sun during the daylight period. Frame G also supports a pair of journals mounting bearings, such as 14, upon which are supported brackets 15 in turn attached to and depending from the bottom of collector C. The brackets 15 are preferably rigidly attached to the collector C, but are rotatable on the bearings 14—14. One of these brackets 15 has an extension supporting a counterweight 2. One of the bearings 14 is driven by a timed gear motor arrangement which will cause the collector C to vary its angle about the axis defined by the bearings 14—14 so as to follow the sun in the path of its orbit. The mechanisms, including the gear motors above described, form no part of the present invention, and such mechanisms are obviously well-known, being similar to those used to control the angularity of telescopes.

The base 1 supports a tubular housing, such as 10. This housing is located between the frames G and directly under the mirror E. Rod-like supports 3a adjustably mounted at 3b on opposite sides of the tubular support 10 pivotally attach to the sides of mirror E. Tubular support 10 carries at its upper end a lens, indicated as L, which will be hereinafter described.

The collector C is proposed to be as large as 78 inches in diameter, and has a central hole 11 which is 18 inches in diameter. Collector C may be constructed with a base of wire mesh reinforced plaster. Upon this base are placed one inch squares of mirror glass to form a mosaic mirror. This construction concentrates the light received from the sun on the concave receiver R which is supported on the collector framework on a tripod, or the like, with the legs 19. The mirror R may be similarly constructed and in turn mounted on the tripod in a manner to direct reflected rays in a parallel path to the mirror D. This mirror in turn is mounted on a line of centers for the shafts 14—14 and the center R for pivoting of frames G. Mirror E in turn may be adjusted vertically on its rod support 3a and also tilted to the proper angle whereby the rays reflected from the inclined mirror D are in turn directed vertically on the surface of the lens L. Since the orbit of the sun changes with respect to the base 1 from day-to-day, it may be necessary to adjust the angularity and position of the mirror E from day-to-day in order that the reflected rays therefrom strike the lens surface L vertically. If the axis of the bearings 14—14 are in a plane passing through the earth axis, then the motor N can be energized from day-to-day to change the inclination of the axis of the shafts 14—14 to align the collector C with change in the angle of altitude of the sun's orbit. During the daylight period, a suitable timed gearing mechanism, aforementioned, rotates the collector C about the bearings 14—14 to follow the sun's position in that orbit selected. Thus, it can be stated that the rotation of the mirror D about the bearings 14—14 changes the azimuth angle of the collector C to follow the sun, whereas motor N and gears M and F change the angle of altitude of the collector C to follow the change in orbit.

In the modification shown in FIG. 2, a round table T is supported on the legs 43. The table T has a hole through the center exposing the lens L, which again is of considerable diameter and the construction of which will be hereinafter described. The round table T supports a plurality of carriages CA, which may be interconnected and power driven to vary the azimuth angle of the mirror CR. Below the edge of the table T is a cylindrical shaped cam CM upon which a follower FM bears. The follower FM is connected by the rod RD with mechanism attached to the mirror CR for rocking the mirror about a horizontal axis of the pivots PP, thus, to vary the vertical angle with changes in altitude of the sun as the carriages rotate around the table. Of course, the size of the table may be very large and the number of carriages CA and collector receivers CR mounted thereon is not limited except by the size of the table. Each carriage CA may be interconnected with another carriage CA, so that they rotate around the table together. A drive mechanism also mounted on the round table is timed to rotate the carriages with the change in azimuth angle of the sun. The construction of a mechanism, according to the modification shown in FIG. 2, will be illustrated and described hereinafter in more detail. In the case of the second embodiment, the dispersed collector means are the separate mirrors CR, while in the first embodiment the dispersed collector means are the small reflecting mirrors on the collector C.

In the case of the third embodiment of this invention, reference is made to FIGS. 3 and 4, FIG. 3 being a side view and FIG. 4 being a top view. The dispersed collector means C, according to this embodiment, comprise a plurality of mirrors, which are arranged to rotate on vertical axes in unison and on horizontal axes to tilt separately. In this way, the sun's path or orbit can be tracked, and the collected rays reflected to the receiver R which is a fixed mirror. The latter directs the rays onto the lens L, which is a common feature of all modifications, and is capable of being constructed in huge size. The lens focuses the rays of the sun, and the zone in which these rays are focused becomes a high temperature source, which is conveniently located to be utilized for any of the purposes above-mentioned. In this modification, the receiver R is a mirror mounted at approximately 45 degrees and facing north. The collectors C all face south, and are located on an east, west line, it is estimated that with a 52 inch lens, the amount of heat collected on a clear day would keep 19 tons of water boiling.

Each of these embodiments use a lens constructed as illustrated in FIG. 5. In the preferred form of the construction, a steel or aluminum angle iron ring is spanned by a membrane of "Mylar" of about $1/1000$ inch thick as indicated at 5. The membrane is fastened at the edges by a plywood ring, such as 6, fastened to the horizontal web of the angle iron ring 4 by suitable bolts, such as 7. Water or other fluid is then poured into the ring 4, so as to be supported exclusively by the "Mylar" membrane. For lens of 52 inches, the depth of fluid should be between 5½ and 8 inches. A ring, such as 8, covered by a membrane, such as 9, of "Mylar" approximately $5/1000$–$10/1000$ of an inch in thickness closes the upper side of the ring of the lens preventing disturbance of the surface of the fluid in the lens. The weight of the fluid on the membrane will cause $1/1000$ inch membrane of "Mylar" to form a curve approximately on a radius of 66 inches, which will give a focal point displaced from the lens 132 inches.

Obviously, the efficiency of a solar machine depends upon how many rays of light can be collected, and, although, the modification described above in FIG. 1 has a 17 or 18 foot collector mirror working with a 52 inch lens, it has certain limitations in this respect, for this reason, the modification shown and hereinafter described in FIG. 2 and FIGS. 6 through 13, inclusive, represents some improvement over FIG. 1, because the number of collector mirrors used and their size is not strictly limited, but is capable of considerable variation. In this modification, the collector and receiver means are combined in one mechanism so to speak. Thus, in FIG. 2, the liquid filled lens L or 21 is mounted beneath the table 24, which is, in turn, supported on a plurality of legs 43. This forms a stationary support, not subject to great vibration, which means less disturbance of a pool type of lens but it may be preferable to have the table 24 supported separately from the lens to avoid the vibration of the power operated mechanism affecting the lens. The table 24 is circular, and it has a central aperture directly above the liquid filled lens and preferably at least as large as the lens. Adjacent the under side of the table 24 at the periphery thereof is a cam track 27 (FIG. 9), which is narrow at one end, and gradually increases in depth to provide an undulating surface for the purpose which will be hereinafter explained in detail. This cam forms part of a mechanism for focusing the collector receiver means in the form of the mirrors 20, so that the mirrors will track the sun during its orbit.

The collector receiver, according to this modification, is supported on one or more carriages, such as CA, mounted on suitable wheels to travel around the periphery of the table in a fixed path. For this purpose, the carriage is constructed with a pair of suitably braced uprights 30, each of which are supported for traveling about the table by small wheels 29 resting on the upper surface of the table, and a small guide wheel 40 supported on an axle in the bracket 65, and positioned to ride on the under edge of the table. The two wheels may be supported in any suitable manner, preferably on stub shafts mounted on the upright 30 and in the bracket 65 attached to the upright 30, preferably the lower wheel is spaced radially from the upper wheel, all as shown in FIG. 7. There is also a wheel which contacts the radial face of the table, such as 51, mounted on a stub shaft in a bracket secured to one of the uprights 30. At the opposite side of the table is the other upright 30 of the carriage, and this upright also carries a wheel traveling on the periphery of the table against the radial face or edge, this wheel is also mounted on a stub shaft on a bracket 65 secured to the upright 30. Bracket 65 carries wheel 40, which bears on the under side of the table as well as a wheel 51 on the edge of the table.

The two uprights 30 of the carriage CA are braced in spaced relation by cross members 30a and 30b, and each upright is formed with a horizontal bearing for supporting a stub shaft 31. The stub shafts carry a frame mechanism, such as 32, which, in turn, supports the collector mirrors. The mirrors may be made up of 12 inch square mirrors mounted on a suitable base, and the base, in turn, supported in the framework 32.

One of the stub shafts 31 has secured thereto a crank arm 26b, the end of which connects with a rod 26a, which forms an articulated connection with a connecting rod 26 mounted in suitable supports for sliding movement on one of the uprights 30. The lower end of the connecting rod 26 attaches to an adjustable bracket 41 carrying the threaded end of a stub shaft, such as 38, which extends horizontally inwardly under the edge of the table, and carries a grooved cam follower 28 riding on the cam surface 27.

The cam surface 27, as shown in FIG. 9, is an undulating surface having portions marked morning, noon and evening. When the mirrors face directly south, the cam follower is on the portion of the cam marked noon. The carriages will move from the portion of the cam indicated as morning to the portion of the cam marked noon, and during this portion of travel the mirror angle about the shaft 31, with respect to the carriage 30, is changed, so as to keep the mirror facing the sun, and the reflected rays from the mirror focused on the lens in the center of the table. As the sun passes its zenith, the inclination of the mirror decreases performing the same result. As shown, the mechanism includes two of these carriages supporting a single large mirror, but it is contemplated that the number of carriages and mirrors will vary with the size of the machine.

The carriages are rotated around the edge of the table by a drive mechanism, which is timed to move the mirror and carriages to track the sun, for this purpose, the drive mechanism may have a synchronous motor or one of constant sped, and the speed of travel may be varied to synchronize with the time of the sunrise and sunset by a suitable friction drive mechanism to be hereinafter described. In FIG. 7, the drive mechanism includes a housing H, in which is a synchronous or constant speed motor, the housing H, in turn, is supported against the edge of the table by one or more guide wheels G mounted on stub shafts beneath the housing, and is propelled around the table by the friction wheel 33, which engages the upper surface of the table. Brace rods 23 and 25 interconnect the drive mechanism with each of the carriages for supporting the collectors, and the carriages for the collectors are, in turn, also connected to one another by such a brace rod system so that they remain equally spaced from one another, and equally spaced from the drive mechanism. This provides a constant speed drive for controlling the azimuth angle to track the sun. The constant speed drive means constant angular change which will not give exact azimuth tracking. However, this should be sufficiently accurate for the purposes. If more accurate tracking is desired a timed variable speed motor can be used. As pointed out heretofore, the cam 27 and its follower control mechanism connected to each of the mirrors, controls the vertical angle to track the altitude during the orbit of the sun, now since the time interval between sunrise and sunset varies, it is necessary to provide for variation in the drive ratio between the drive mechanism and the table, because the drive mechanism has a constant speed motor. FIG. 12 indicates the construction for changing the drive ratio between the drive wheel 33 and the table, in this figure the motor drives the shaft 53 which, in turn, drives the pulley 54 and through the belt 55, the pulley 56. Pulley 56, in turn, is keyed to and revolves a threaded sleeve 61 mounted for rotation on a stub shaft 59 suitably secured in the wall 52 of the gear box of the drive carriage mechanism. Sleeve 61, in turn, has suitable threads on its outer periphery, which, in turn, engage with threads in the hub of drive wheel 33. A pair of stop nuts 60 on opposite sides of the drive wheel 33 fix its position, but permit for its adjustment longitudinally of the sleeve 61. By loosening the nuts, the drive wheel 33 may be moved on the threaded sleeve 61 inwardly toward the center of the table or outwardly toward its periphery to correspond with indications on the top surface of the table at graduated radial distances, one from the other, to indicate the proper location and radial position of the drive wheel 33 for the particular day of the month. As the wheel 33 is moved radially in and out, the number of revolutions of the wheel for a particular angular travel about the table is varied, thus, varying the drive ratio between the drive mechanism and the table between the graduations as FIG. 13.

In this mechanism as the sun moves in its orbit from sunrise to sunset, the collector mirrors CR change in azimuth and vertical angle to reflect the sun's rays onto the lens L, and during the hours of darkness they move around again to the position to repeat the cycle.

The third embodiment of the invention, illustrated in FIGS. 3 and 4, has banks of collector means, which are banks of mirrors all held automatically in focus with the fixed mirror 45, which is the receiver R. The mechanism for performing this function is illustrated schematically in FIGS. 14, 15 and 16. Turning now to FIG. 14, each mirror forming a collector C is formed of a plurality of square mirrors mounted on a backing, such as plywood 85, suitably trussed at 86, and attached by the trusses 86 to a rotatable shaft 88. Counterweights 89 and 90 on suitable arms 91 and 92 attached to the shaft 88 tend to balance the weight of the mirrors about a horizontal axis. Shaft 88 is, in turn, mounted for rotation about a horizontal axis in a journalled sleeve 95, which is, in turn, attached to a vertical shaft, such as 96, supported against vertical thrust by bearings 97 at the upper end of the standard 99. Each standard 99 is fixed in a concrete base a certain distance from each other standard 99 carrying the other collector means, and each of these collector means is controlled as to azimuth angle by a line shaft drive 100 driving a plurality of gears 101, which in turn, are meshed with individual gears 102 on individual vertical drive shafts 103. The line shaft 100, in turn, is driven by a timed variable speed motor, so as to vary the azimuth angle of all of the mirrors C, simultaneously, but the vertical angle for the altitude tracking of the sun is controlled by separate motors on each of the standards 99. For this purpose is shown a motor of a constant speed type indicated as 110 operating a gear train indicated as 111, which in turn, through a suitable worm gear and worm wheel 112 fixed to the shaft 88 changes the vertical angle of the mirrors C. The motor 110 may have a suitable reversing switch operated from the azimuth angle control, so that at high noon the motor will reverse to decrease the vertical angle of the mirrors.

It is estimated that each standard 99 could carry a mirror at least 35 feet in diameter, so that the ray collecting power of this particular embodiment is much greater than any of those heretofore shown and described. And in order to keep all of the large mirrors C focused on the fixed mirror R, each is equipped with a separate aiming device forming an electrical control for the motor 110. The aiming device here contemplated is controlled by a series of aiming tubes, one for each mirror C, all of which are mounted in the center of the fixed mirror R. The aiming device contemplated is illustrated in FIG. 16, and each aiming device has a tube 120 mounted in the fixed mirror R, and aimed directly at the center of one of the mirrors C. Each tube is approximately 14 inches long and has a 1/16 inch hole for admission of light rays from the mirror C at one end to a photoelectric cell 122 mounted in its opposite end. Each cell, in turn, is connected to a suitable electric control of a conventional type, which control is operatively connected to each motor 110. With this mechanism so interconnected, if one of the mirrors C gets out of step the photoelectric cell immediately stops the motor 110 until the rays of the sun again enter the 1/16 inch hole in the end of the aiming tube. The rate of vertical angle change of each mirror C is, therefore, individually controlled to remain in step regardless of the change in altitude of the position of the sun with the change in season.

A construction has been described which will fulfill all of the objects of the present invention, but it is contemplated that other modifications will occur to those skilled in the art, which come within the scope of the appended claims.

Having thus described the invention, what is claimed and desired to be secured by Letters Patent is:

1. A solar type of heating system for concentrating the heating effect of the diffused rays emitted from a source of heat at a focal point or points, comprising, a collector means, dirigible means mounting said collector means, a receiver means for receiving the collected rays from said collector means, a power mechanism synchronized with time to operate said dirigible means for maintaining the collector means faced toward the heat source and to transmit directly to said receiver means, said receiver means being disposed to direct the rays received to the plane surface of a symmetrical lens formed in part by gravitational forces acting on a pool of transparent fluid of varying depth from the center to the edges and in part by an elastic transparent membrane for focusing the rays transmitted from said receiver means to a plurality of points in a heating zone of linear length.

2. A solar type of heating system for concentrating the heating effect of the diffused rays emitted from a source of heat at a focal point or points, comprising, a collector means, dirigible means mounting said collector means, a receiver means for receiving the collected rays from said collector means, a power mechanism synchronized with time to operate said dirigible means for maintaining the collector means faced toward the heat source and to transmit directly to said receiver means, said receiver means being disposed to direct the rays received to the plane surface of a symmetrical lens formed in part by gravitational forces acting on a pool of transparent fluid of varying depth from the center to the edges and in part by an elastic transparent membrane for focusing the rays transmitted from said receiver means to a plurality of points in a heating zone of linear length, and means adjacent the focal point of said lens for converting the localized high temperatures to useful work.

3. A solar type of heating system for concentrating the heating effect of the diffused rays emitted from a source of heat at a focal point or points, comprising, a collector means, a receiver means for receiving the collected rays from said collector means, dirigible means mounting said collector means and said receiver means for movement together, a power mechanism synchronized with time for varying the vertical angle and the azimuth angle of said collector means by operating said dirigible means for maintaining the collector means faced toward the heat source, said receiver means being disposed to direct the rays received to the plane surface of a symmetrical lens formed in part by gravitational forces acting on a pool of transparent fluid of varying depth from the center to the edges and in part by an elastic transparent membrane for focusing the rays transmitted from said receiver means to a plurality of points in a heating zone of linear length, and means adjacent the focal point or points of said lens for converting the localized high temperatures to useful work.

4. A solar type of heating system for concentrating the heating effect of the diffused rays emitted from a source of heat at a focal point or points, comprising, a collector means, a receiver means for receiving the collected rays from said collector means, dirigible means mounting said collector means and said receiver means in spaced relation, a power mechanism synchronized with time for changing the azimuth angle and the vertical angle of said collector means by operation of said dirigible means for maintaining the collector means faced toward the heat source, said receiver means beng disposed to direct the rays received to the plane surface of a symmetrical lens formed in part by gravitational forces acting on a pool of transparent fluid of varying depth from the center to the edges and in part by an elastic transparent membrane for focusing the rays transmitted from said receiver means to a plurality of points in a heating zone of linear length, a stationary mounting for said lens, reflector means receiving the rays from said movable receiving means and focusing said rays on said lens, and a mounting means for said reflector means on said dirigible means and on said lens.

5. A solar type of heating system for concentrating the heating effect of the diffused rays emitted from a source of heat at a focal point or points, comprising, a collector means, said collector means including a plurality of mirrors with individual movable mountings, a receiver means having a stationary mirror, dirigible means for each of the individually mounted mirrors of the collector means, a power mechanism synchronized with time to operate said dirigible means for maintaining the collector means faced toward the heat source and to transmit directly to said receiver means, means for aiming the individual mirrors of the collector means at the receiver means, and a stationary symmetrical lens fixed in relation to said receiver means and formed in part by gravitational forces acting on a pool of transparent fluid of varying depth from the center to the edges and in part by an elastic transparent membrane for focusing the rays transmitted from said receiver means to a plurality of points in a heating zone of linear length.

6. A solar type of heating system for concentrating the heating effect of the diffused rays emitted from a source of heat at a focal point or points, comprising, a collector means having a plurality of mirrors with individual angular adjustment for vertical and azimuth angle, dirigible means mounting the individual mirrors of the collector means, a stationary receiver means for receiving the collected heat rays from the collector means, a power mechanism synchronized with time to operate said dirigible means for changing the azimuth angle of each of said individual mirrors of the collector means so as to transmit the collected rays toward said receiver means, control means on said receiver means for individually aiming the separate mirrors in said collector means, and a symmetrical lens fixed with respect to said receiver means and formed in part by gravitational forces acting on a pool of transparent fluid of varying depth from the center to the edges and in part by an elastic transparent membrane for focusing the rays transmitted from said receiver means to a plurality of points in a heating zone of linear length.

7. A solar type of heating system for concentrating the heating effect of the diffused rays emitted from a source of heat at a focal point or points, comprising, a collector means including a plurality of mirrors on separate mountings, dirigible means for each mirror mounting of said collector means, a receiver means for receiving the collected heat rays from said collector means, a power mechanism synchronized with time to operate said dirigible means for changing the azimuth angle of all of said mirrors in said collector means to maintain said mirrors faced toward the heat source and to transmit directly to said receiver means, power operated means acting to tilt each mirror of said collector means on its mounting, control means for said power means including an aiming device affixedly mounted in said receiver means and a symmetrical lens on a stationary mounting in fixed relation to said receiver means, said lens being formed in part by gravitational forces acting on a pool of transparent fluid of varying depth from the center to the edges and in part by an elastic transparent membrane for focusing the rays transmitted from said receiver means to a plurality of points in a heating zone of linear length.

8. A solar type of heating system for concentrating the heating effect of the diffused rays emitted from a source of heat at a focal point or points, comprising, a collector means, a receiver means for reflecting the collector rays from said collector means, and a lens disposed to receive the reflected rays from said receiver means and to focus the rays reflected from said receiver means, said lens being formed in part by forces of the gravitational kind acting in one direction on a pool of transparent fluid and in the opposite direction supported by a flexible sheet of transparent membrane supported about its periphery which sheet is variably curved to a symmetrical convex shape by non-uniform load distribution thereon for focusing the rays transmitted from said receiver means at a plurality of vertically displaced focal points.

9. A solar type of heating system for concentrating the heating effect of the diffused rays emitted from a source of heat at a focal point or points, comprising, a collector means, a receiver means for receiving the collected rays reflected from said collector means and in turn reflecting said rays, and a lens disposed to receive the reflected rays from said receiver means and to focus the rays reflected from said receiver means, said lens being formed in part by forces of the gravitational kind acting in one direction on a pool of transparent fluid and in the opposite direction by a supporting sheet of transparent membrane supported about its periphery, which sheet is variably curved to a symmetrical convex shape by non-uniform load distribution theron.

10. A solar heating system comprising in combination, a plurality of mirrors arranged in series to reflect light successively from the first in the series to the last therein, the first mirror in the series being dirigible and addressed toward the sun, means for driving said first mirror to maintain its address toward the sun as the latter moves in its orbit, the last mirror in the series being arranged to downwardly reflect light incident upon it emanating from the next preceding mirror of the series, a lens arranged to receive light reflected downwardly by said last mirror and to concentrate the same in a heating zone beneath said lens, said lens consisting of a pool of transparent liquid sustained by an elastic transparent membrane whose periphery is supported by a relatively rigid ring and whose center sags under the weight of the pool of liquid so that said pool has an upper surface which is substantially level and a depth which varies substantially symmetrically from zero at its periphery to a maximum adjacent the center of said membrane.

11. A solar type of heating system for concentrating the heating effect of the diffused rays emitted from a source of heat at a focal point or points, comprising, a collector means including an inclined mirror mounted in a carriage, dirigible means supporting said carriage for rotation thereof about a circular path for changing the azimuth angle of said mirror, a power mechanism synchronized with time to operate said dirigible means for maintaining the collector means at the proper azimuth angle to track the sun, means for adjusting the vertical angle of said collector means in synchronism with change in azimuth angle, a symmetrical lens centrally located with respect to said circular path formed in part by gravitational forces acting on a pool of transparent fluid of varying depth from the center to the edges and in part by an elastic transparent membrane, said pool having its upper surface disposed in the path of rays reflected from said mirror for focusing said rays at a plurality of points in a heating zone of linear length.

12. A solar type of heating system for concentrating the heating effect of the diffused rays emitted from a source of heat at a focal point or points, comprising, a collector means including a mirror mounted on a carriage, dirigible means having a circular table and a power operated device connected to said carriage about the periphery of said circular table to vary the azimuth angle, a power driven mechanism on said table for rotating said carriage about the periphery thereof and connected therewith, said drive mechanism having driving means engaging said table, means to vary the drive ratio between said drive mechanism and said table, and a symmetrical lens centrally located with respect to said table and formed in part by gravitational forces acting on a pool of transparent fluid of varying depth from the center to the edges and in part by an elastic transparent membrane, said pool having its upper surface disposed in the path of rays reflected from said mirror for focusing said rays at a plurality of points in a heating zone of linear length.

13. A solar type of heating system for concentrating the heating effect of the diffused rays emitted from a source of heat at a focal point or points, comprising, collector means including a mirror mounted on a traveling carriage, dirigible means including a table about the periphery of which said carriage is adapted to move, a power mechanism synchronized with time for traveling said carriage about the periphery of said table to vary the azimuth angle of the mirror of said collector means, means for varying the vertical angle of the mirror of said collector means including a cam track arranged about the periphery of said table and a mechanism including a follower and linkage operated by said cam track to tilt said mirror, and a symmetrical lens centrally located with respect to said dirigible means formed in part by gravitational forces acting on a pool of transparent fluid of varying depth from the center to the edges and in part by an elastic transparent membrane, said pool having its upper surface disposed in the path of rays reflected from said mirror for focusing said rays at a plurality of points in a heating zone of linear length.

14. A solar type of heating system for concentrating the heating effect of the diffused rays emitted from a source of heat at a focal point or points, comprising, a collector means including a reflector, a receiver means for receiving the collected rays reflected from said collector means and for reflecting said rays on a focusing lens, dirigible means mounting said collector means in spaced relation to said receiver means, power mechanism for changing the azimuth and the vertical angle of said collector means by operation of said dirigible means for maintaining the collector means faced toward the heat source, and a control for said power mechanism including a light sensitive cell at one end of an open ended tube on said receiver means through which light rays can pass to said cell from said collector means and de-energize said power means.

15. A solar heating system comprising in combination dirigible means for collecting rays from the sun and reflecting them downwardly toward a predetermined horizontal area, means for driving said dirigible means to maintain its reception of rays from the sun as the latter moves in its orbit and its reflection of such rays toward said horizontal area, a lens having a substantially flat upper surface at said predetermined horizontal area, said lens being arranged to receive light reflected downwardly by said dirigible means and to concentrate the same in a heating zone beneath said lens, said lens consisting of a pool of transparent liquid sustained by an elastic transparent membrane whose periphery is supported by a relatively rigid ring and whose center sags under the weight of the pool of liquid so that said pool has an upper surface which is substantially level and a depth which varies substantially symmetrically from zero at its periphery to a maximum adjacent the center of said membrane.

References Cited by the Examiner
UNITED STATES PATENTS

| | | | |
|---|---|---|---|
| 504,890 | 9/93 | Ohmart | 126—270 X |
| 608,755 | 8/98 | Cottle | 126—270 X |
| 2,051,791 | 8/36 | Luce | 88—59 |
| 2,291,534 | 7/42 | Deppe | 126—270 X |
| 2,300,251 | 10/42 | Flint | 88—57 |

FOREIGN PATENTS

| | | |
|---|---|---|
| 386,264 | 12/23 | Germany. |
| 394,232 | 4/24 | Germany. |
| 370,365 | 4/39 | Italy. |

JAMES W. WESTHAVER, *Primary Examiner.*